United States Patent
Wang

(10) Patent No.: US 10,382,901 B2
(45) Date of Patent: Aug. 13, 2019

(54) PROCESSING METHOD AND APPARATUS FOR MULTIPLE EMBMS SERVICE SOURCES

(71) Applicant: Huawei Technologies Co., Ltd., Shenzhen (CN)

(72) Inventor: Xiangyang Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 255 days.

(21) Appl. No.: 15/502,830

(22) PCT Filed: Aug. 26, 2014

(86) PCT No.: PCT/CN2014/085220
§ 371 (c)(1),
(2) Date: Feb. 9, 2017

(87) PCT Pub. No.: WO2016/029363
PCT Pub. Date: Mar. 3, 2016

(65) Prior Publication Data
US 2017/0238150 A1 Aug. 17, 2017

(51) Int. Cl.
| | |
|---|---|
| *H04W 4/06* | (2009.01) |
| *H04L 12/18* | (2006.01) |
| *H04N 21/462* | (2011.01) |
| *H04W 48/18* | (2009.01) |
| *H04W 4/38* | (2018.01) |

(52) U.S. Cl.
CPC ............ *H04W 4/06* (2013.01); *H04L 12/189* (2013.01); *H04N 21/4622* (2013.01); *H04W 4/38* (2018.02); *H04W 48/18* (2013.01)

(58) Field of Classification Search
CPC ......... H04W 4/06; H04W 4/38; H04W 48/18; H04N 21/4622; H04L 12/189
See application file for complete search history.

(56) References Cited

U.S. PATENT DOCUMENTS

| | | | | |
|---|---|---|---|---|
| 2006/0067281 | A1* | 3/2006 | Kwak | H04W 76/40 370/337 |
| 2009/0069003 | A1* | 3/2009 | Kim | H04W 28/06 455/422.1 |

(Continued)

FOREIGN PATENT DOCUMENTS

| | | |
|---|---|---|
| CN | 101094433 | 12/2007 |
| CN | 101094433 A | 12/2007 |

(Continued)

OTHER PUBLICATIONS

Foreign Communication From a Counterpart Application, Japanese Application No. 2017-510480, Japanese Office Action dated Apr. 3, 2018, 5 pages.

(Continued)

*Primary Examiner* — Rina C Pancholi
(74) *Attorney, Agent, or Firm* — Conley Rose, P.C.

(57) ABSTRACT

A processing method and apparatus for multiple eMBMS service sources is presented. The method includes that receiving at least one service list sent by at least one network device; merging the at least one service list to generate an integrated service list, where the integrated service list records a first correspondence between the at least one service list and the at least one network device, where each of the service list includes at least one service; and providing the integrated service list to user equipment, so that a user selects a target service according to the integrated service list. Service lists of multiple network devices are merged to form an integrated service list, and the integrated service list is provided to user equipment, so that a user selects a target service according to the integrated service list, which effectively increases service types, and enriches service functions.

15 Claims, 11 Drawing Sheets

(56) References Cited

U.S. PATENT DOCUMENTS

| | | | | |
|---|---|---|---|---|
| 2011/0305183 | A1* | 12/2011 | Hsu | H04W 72/005 |
| | | | | 370/312 |
| 2013/0170421 | A1* | 7/2013 | Wang | H04W 4/06 |
| | | | | 370/312 |
| 2014/0146737 | A1 | 5/2014 | Ohshima et al. | |
| 2015/0119023 | A1* | 4/2015 | Wang | H04W 4/06 |
| | | | | 455/432.1 |

FOREIGN PATENT DOCUMENTS

| | | | |
|---|---|---|---|
| CN | 101754100 | A | 6/2010 |
| CN | 102137066 | A | 7/2011 |
| CN | 102440066 | A | 5/2012 |
| JP | 2003209877 | A | 7/2003 |
| JP | 2008277998 | A | 11/2008 |
| JP | 2013066249 | A | 4/2013 |
| JP | 2013534087 | A | 8/2013 |
| WO | 2009031827 | | 3/2009 |
| WO | 2011157216 | A1 | 12/2011 |
| WO | 2013047235 | A1 | 4/2013 |

OTHER PUBLICATIONS

Foreign Communication From a Counterpart Application, Japanese Application No. 2017-510480, English Translation of Japanese Office Action dated Apr. 3, 2018, 5 pages.

Machine Translation and Abstract of Chinese Publication No. CN101094433, Dec. 26, 2007, 20 pages.

Foreign Communication From a Counterpart Application, Chinese Application No. 201480044903.8, Chinese Office Action dated Jul. 31, 2018, 6 pages.

Machine Translation and Abstract of Japanese Publication No. JP2003209877, Jul. 25, 2003, 17 pages.

Machine Translation and Abstract of Japanese Publication No. JP2008277998, Nov. 13, 2008, 11 pages.

Machine Translation and Abstract of Japanese Publication No. JP2013066249, Apr. 11, 2013, 58 pages.

Foreign Communication From a Counterpart Application, Japanese Application No. 2017-510480, Japanese Office Action dated Oct. 2, 2018, 5 pages.

Foreign Communication From a Counterpart Application, Japanese Application No. 2017-510480, English Translation of Japanese Office Action dated Oct. 2, 2018, 6 pages.

Foreign Communication From a Counterpart Application, European Application No. 14900655.3, Extended European Search Report dated May 12, 2017, 8 pages.

Foreign Communication From a Counterpart Application, PCT Application No. PCT/CN2014/085220, English Translation of International Search Report dated May 27, 2015, 2 pages.

Foreign Communication From a Counterpart Application, PCT Application No. PCT/CN2014/085220, English Translation of Written Opinion dated May 27, 2015, 5 pages.

* cited by examiner

US 10,382,901 B2

PROCESSING METHOD AND APPARATUS FOR MULTIPLE EMBMS SERVICE SOURCES

CROSS-REFERENCE TO RELATED APPLICATIONS

This application is a national stage of International Patent Application No. PCT/CN2014/085220 filed Aug. 26, 2014, which is hereby incorporated by reference in its entirety.

TECHNICAL FIELD

Embodiments of the present disclosure relate to the field of communications technologies, and in particular, to a processing method and apparatus for multiple evolved multimedia broadcast multicast service (eMBMS) service sources.

BACKGROUND

With development of mobile Internet, mobile data traffic will continue to grow significantly in the coming few years, and video services occupy the largest share of network data traffic. Relative to a second-generation/third-generation cellular network that support only unicast, a Long Term Evolution (LTE) network supports larger bandwidth, and a multicast service uses a dedicated channel, which reduces network resources. eMBMS is an example in which the LTE network is applied to a video service.

In the prior art, eMBMS solutions include two types. A first type is a terminal device that integrates an application program, an eMBMS service component, and an eMBMS receiving unit. The eMBMS receiving unit is configured to receive an eMBMS service list from a network side, and the service list is provided using the eMBMS service component and the application program to a user for selection. A second type is a terminal device that integrates an application program and an eMBMS service component. An eMBMS receiving unit is integrated into an access device. The terminal device receives a service list and eMBMS data using the eMBMS receiving unit in the access device, where the access device may be mobile Wi-Fi (MiFi), a router, a mobile phone, and the like.

However, in the existing two solutions, the eMBMS data can be received only using the unique eMBMS receiving unit in the terminal device or in the access device, and a service function of one eMBMS receiving unit is limited, thereby leading to a monotonous type of the eMBMS service received by user equipment.

SUMMARY

Embodiments of the present disclosure provide a processing method and apparatus for multiple eMBMS service sources, which resolve a problem of a monotonous service type of an eMBMS service received by user equipment, where the problem is caused because a service list is received using a unique eMBMS receiving unit and a service function of one eMBMS receiving unit is limited.

A first aspect of the present disclosure provides a processing method for multiple eMBMS service sources, including receiving at least one service list sent by at least one network device; merging the at least one service list to generate an integrated service list, where the integrated service list records a first correspondence between the at least one service list and the at least one network device, where each of the service list includes at least one service; and providing the integrated service list to user equipment, so that a user selects a target service according to the integrated service list.

With reference to the first aspect, in a first possible implementation manner of the first aspect, the merging the at least one service list to generate an integrated service list includes adding the at least one service list to generate the integrated service list, where a repeated or non-repeated service exists in the at least one service list included in the integrated service list.

With reference to the first aspect, in a second possible implementation manner of the first aspect, the merging the at least one service list to generate an integrated service list further includes merging the service of the at least one service list to generate the integrated service list, where no service included in the integrated service list is repeated; and recording, according to the first correspondence, a second correspondence between each service and the at least one network device that sends the service.

With reference to any of the first aspect and the first and the second possible implementation manners of the first aspect, in a third possible implementation manner of the first aspect, the providing the integrated service list to user equipment, so that a user selects a target service according to the integrated service list includes sending the integrated service list to the user equipment, so that the user selects the target service according to the integrated service list; receiving a service request sent by the user equipment, where the service request includes the target service selected by the user; searching, according to the first correspondence or the second correspondence, for the at least one network device corresponding to the target service; and obtaining, from the at least one network device corresponding to the target service, service data of the target service.

With reference to any of the first aspect and the first and the second possible implementation manners of the first aspect, in a fourth possible implementation manner of the first aspect, the providing the integrated service list to user equipment, so that a user selects a target service according to the integrated service list includes displaying the integrated service list, so that the user selects the target service according to the integrated service list; receiving an operation of selecting the target service by the user; searching, according to the first correspondence or the second correspondence, for the at least one network device corresponding to the target service; and obtaining, from the at least one network device corresponding to the target service, service data of the target service.

With reference to the third or the fourth possible implementation manner of the first aspect, in a fifth possible implementation manner of the first aspect, if a quantity of the network devices corresponding to the target service is greater than one, the obtaining, from the at least one network device corresponding to the target service, service data of the target service includes obtaining, from each of the network devices corresponding to the target service, data of a service corresponding to the target service, where the data is processed by merging into the service data of the target service; or selecting, from each of the network devices corresponding to the target service, a first network device with a strongest eMBMS signal; and obtaining data that is corresponding to the target service and is in the first network device as the service data of the target service.

A second aspect of the present disclosure provides a processing apparatus for multiple eMBMS service sources, including an eMBMS receiving module configured to receive at least one service list sent by at least one network device; an eMBMS merging module configured to merge the at least one service list to generate an integrated service list, where the integrated service list records a first correspondence between the at least one service list and the at least one network device, where each of the service list includes at least one service; and an eMBMS processing module configured to provide the integrated service list to user equipment, so that a user selects a target service according to the integrated service list.

With reference to the second aspect, in a first possible implementation manner of the second aspect, the eMBMS merging module is configured to add the at least one service list to generate the integrated service list, where a repeated or non-repeated service exists in the at least one service list included in the integrated service list.

With reference to the second aspect, in a second possible implementation manner of the second aspect, the eMBMS merging module is configured to merge the service of the at least one service list to generate the integrated service list, where no service included in the integrated service list is repeated; and record, according to the first correspondence, a second correspondence between each service and the at least one network device that sends the service.

With reference to any of the second aspect and the first and the second possible implementation manners of the second aspect, in a third possible implementation manner of the second aspect, the eMBMS processing module includes a sending unit configured to send the integrated service list to the user equipment, so that the user selects the target service according to the integrated service list; a receiving unit configured to receive a service request sent by the user equipment, where the service request includes the target service selected by the user; a search unit configured to search, according to the first correspondence or the second correspondence, for the at least one network device corresponding to the target service; and an obtaining unit configured to obtain, from the at least one network device corresponding to the target service, service data of the target service.

With reference to any of the second aspect and the first and the second possible implementation manners of the second aspect, in a fourth possible implementation manner of the second aspect, the eMBMS processing module includes a display unit configured to display the integrated service list, so that the user selects the target service according to the integrated service list; a receiving unit configured to receive an operation of selecting the target service by the user; a search unit configured to search, according to the first correspondence or the second correspondence, for the at least one network device corresponding to the target service; and an obtaining unit configured to obtain, from the at least one network device corresponding to the target service, service data of the target service.

With reference to the third or the fourth possible implementation manner of the second aspect, in a fifth possible implementation manner of the second aspect, if a quantity of the network devices corresponding to the target service is greater than one, the obtaining unit is configured to obtain, from each of the network devices corresponding to the target service, data of a service corresponding to the target service, where the data is processed by merging into the service data of the target service; or select, from each of the network devices corresponding to the target service, a first network device with a strongest eMBMS signal; and obtain data that is corresponding to the target service and is in the first network device as the service data of the target service.

A third aspect of the present disclosure provides a terminal device, including a receiver configured to receive at least one service list sent by at least one network device; and a processor configured to merge the at least one service list to generate an integrated service list, where the integrated service list records a first correspondence between the at least one service list and the at least one network device, where each of the service list includes at least one service; where the processor is further configured to provide the integrated service list to user equipment, so that a user selects a target service according to the integrated service list.

With reference to the third aspect, in a first possible implementation manner of the third aspect, the processor is configured to add the at least one service list to generate the integrated service list, where a repeated or non-repeated service exists in the at least one service list included in the integrated service list.

With reference to the third aspect, in a second possible implementation manner of the third aspect, the processor is configured to merge the service of the at least one service list to generate the integrated service list, where no service included in the integrated service list is repeated; and record, according to the first correspondence, a second correspondence between each service and the at least one network device that sends the service.

With reference to any of the third aspect and the first and the second possible implementation manners of the third aspect, in a third possible implementation manner of the third aspect, the terminal device further includes a transmitter configured to send the integrated service list to the user equipment, so that the user selects the target service according to the integrated service list; where the receiver is further configured to receive a service request sent by the user equipment, where the service request includes the target service selected by the user; the processor is further configured to search, according to the first correspondence or the second correspondence, for the at least one network device corresponding to the target service; and the processor is further configured to obtain, from the at least one network device corresponding to the target service, service data of the target service.

With reference to any of the third aspect and the first and the second possible implementation manners of the third aspect, in a fourth possible implementation manner of the third aspect, the terminal device further includes a display configured to display the integrated service list, so that the user selects the target service according to the integrated service list; where the receiver is further configured to receive an operation of selecting the target service by the user; the processor is further configured to search, according to the first correspondence or the second correspondence, for the at least one network device corresponding to the target service; and the processor is further configured to obtain, from the at least one network device corresponding to the target service, service data of the target service.

With reference to the third or the fourth possible implementation manner of the third aspect, in a fifth possible implementation manner of the third aspect, if a quantity of the network devices corresponding to the target service is greater than one, the processor is further configured to obtain, from each of the network devices corresponding to the target service, data of a service corresponding to the target service, where the data is processed by merging into the service data of the target service; or select, from each of the network devices corresponding to the target service, a first network device with a strongest eMBMS signal; and obtain data that is corresponding to the target service and is in the first network device as the service data of the target service.

According to the processing method and apparatus for multiple eMBMS service sources provided in the embodiments of the present disclosure, service lists sent by multiple network devices are received; all the received service lists are merged to form an integrated service list; and the integrated service list is provided to user equipment, so that a user selects a target service according to the integrated service list. Compared with the prior art in which a service list and data are received from a unique eMBMS receiving unit, the processing method and apparatus for multiple eMBMS service sources effectively increases service types, and enriches service functions.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
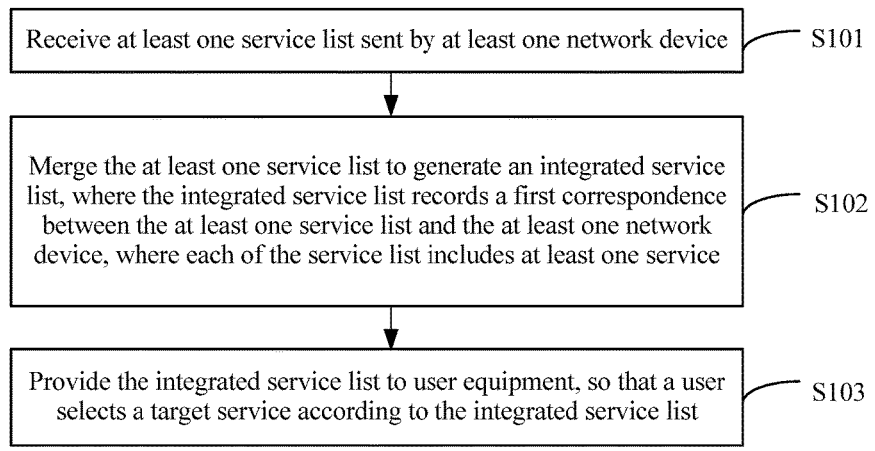
FIG. 1 is a flowchart of Embodiment 1 of a processing method for multiple eMBMS service sources according to the present disclosure.

FIG. 1 is a flowchart of Embodiment 1 of a processing method for multiple eMBMS service sources according to the present disclosure. This solution is executed by a terminal device, where the terminal device may be a mobile phone, a tablet computer, and a mobile player, and may be an access device such as a gateway or a router. A network device may be a device, such as a base station, that provides data on a network side. As shown in FIG. 1, specific steps of the processing method for multiple eMBMS service sources according to this embodiment are as follows.

S101. Receive at least one service list sent by at least one network device.

In this embodiment, a quantity of external network devices and a quantity of sent service lists are not limited. A terminal device receives at least one service list, where a service included in the service list is mainly a service of an eMBMS type.

S102. Merge the at least one service list to generate an integrated service list, where the integrated service list records a first correspondence between the at least one service list and the at least one network device, where each of the service list includes at least one service.

In this embodiment, the terminal device performs merging processing on the received multiple service lists, and records the first correspondence between each of the service list and a corresponding network device, to facilitate subsequent query use. This action is implemented by a merging processor integrated in the terminal device.

S103. Provide the integrated service list to user equipment, so that a user selects a target service according to the integrated service list.

In this embodiment, the integrated service list obtained by merging is provided to the user equipment by displaying or sending or in a manner of an application program, so that the user can intuitively obtain the integrated service list, and select an appropriate target service according to a requirement. The target service may be a service of a type of video, audio, image, and the like.

After a network device that supports a service corresponding to a service request is selected, data of the service corresponding to the service request is obtained from the network device, and the data is processed to finally obtain service data required by the user.

In this embodiment, the service data may be data of a type of video, audio, image, and the like. After obtaining the required service data, the terminal device plays the service data using a player (such as a liquid crystal display and a speaker) on the terminal device.

According to the processing method for multiple eMBMS service sources provided in this embodiment, service lists sent by multiple network devices are received; all the received service lists are merged to generate an integrated service list; and the integrated service list is provided to user equipment, so that a user selects a target service according to the integrated service list. Compared with the prior art in which a service list and data are received from a unique eMBMS receiving unit, the processing method for multiple eMBMS service sources effectively increases service types, and enriches service functions.

In Embodiment 2 of a processing method for multiple eMBMS service sources according to the present disclosure, on a basis of the foregoing embodiment shown in FIG. 1, specific implementation manners of the merging the at least one service list to generate an integrated service list in S102 include the following two types.

First implementation manner includes adding the at least one service list to generate the integrated service list, where a repeated or non-repeated service exists in the at least one service list included in the integrated service list.

In this merging manner in this embodiment, each of the received service list is simply added, and no other processing is performed. The generated integrated service list includes all services in all parallel service lists, where a repeated service exists in the services.

Second implementation manner includes merging the service of the at least one service list to generate the integrated service list, where no service included in the integrated service list is repeated; and recording, according to the first correspondence, a second correspondence between each service and the at least one network device that sends the service.

In this embodiment, at least one group of same services in all the service lists are obtained, and same services of each group are merged into one service in the integrated service list, that is, the merged service corresponds to multiple network devices. Each service included in the integrated service list is unique, and at least one network device corresponding to each service in the integrated service list is recorded.

Figure 2:
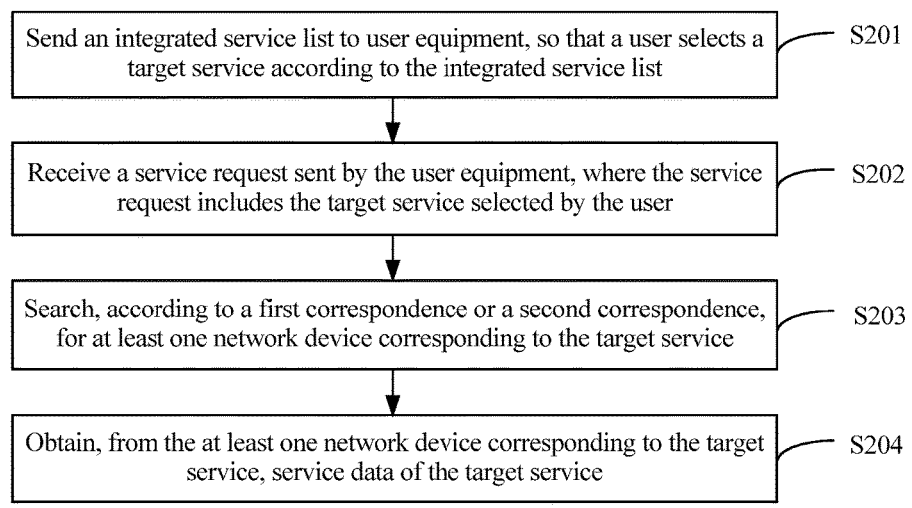
FIG. 2 is a flowchart of Embodiment 3 of a processing method for multiple eMBMS service sources according to the present disclosure.

FIG. 2 is a flowchart of Embodiment 3 of a processing method for multiple eMBMS service sources according to the present disclosure. As shown in FIG. 2, on a basis of the foregoing Embodiment 1 and Embodiment 2, when this embodiment is executed by an access device, such as a gateway and a router, specific implementation steps of the providing the integrated service list to user equipment, so that a user selects a target service according to the integrated service list in Step S103 are as follows.

S201. Send the integrated service list to the user equipment, so that the user selects the target service according to the integrated service list.

In this embodiment, the integrated service list is sent to user equipment that the user can directly operate, so that the user equipment displays or provides the integrated service list to the user using an application program. The user selects an appropriate target service according to a requirement. The user generates a service request, and returns the service request.

S202. Receive a service request sent by the user equipment. The service request includes the target service selected by the user.

In this embodiment, the received service request is the target service selected by the user according to a requirement of the user, or an identifier corresponding to the target service.

S203. Search, according to the first correspondence or the second correspondence, for the at least one network device corresponding to the target service.

In this embodiment, the recorded first correspondence or second correspondence is queried according to the target service, to obtain the at least one network device corresponding to the target service, that is, a situation in which multiple network devices can provide the target service exists.

S204. Obtain, from the at least one network device corresponding to the target service, service data of the target service.

In this embodiment, the service data corresponding to the target service is obtained from the at least one network device, and a specific obtaining manner is not limited, and may be selected according to an actual situation. If only one network device can provide the target service, the service data corresponding to the target service can be obtained only from the network device; if multiple network devices can provide the target service, data corresponding to multiple target services may be obtained and merged, so that target data is more precise, or a first network device with a strongest eMBMS signal may be selected from the multiple network devices, and data that is corresponding to the target service and that is in the first network device is obtained as the service data of the target service.

According to the processing method for multiple eMBMS service sources provided in this embodiment, service lists sent by multiple network devices are received simultaneously; merging processing is performed on all the service lists to obtain an integrated service list, and a first correspondence between a service list and a network device, and a second correspondence between each service in all the service lists and each network device are recorded; the first correspondence or the second correspondence is queried, according to a service request sent by a user, to obtain all network devices that support the target service; data of the service is obtained from all the network devices, and is processed to obtain final service data. Compared with the prior art in which only one service list and data can be received, in the processing method for multiple eMBMS service sources, service data is obtained by merging multiple service lists and by processing data of a service, which enriches service functions and improves precision of the service data.

Figure 3:
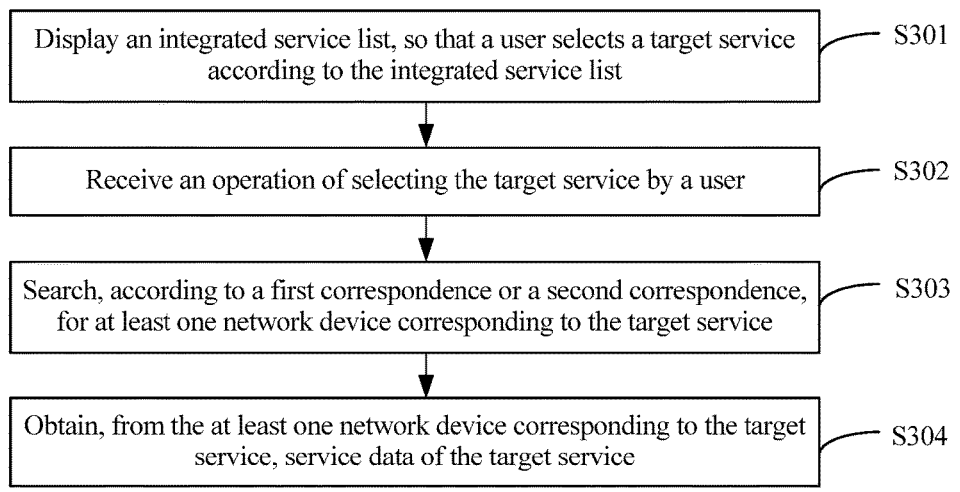
FIG. 3 is a flowchart of Embodiment 4 of a processing method for multiple eMBMS service sources according to the present disclosure.

FIG. 3 is a flowchart of Embodiment 4 of a processing method for multiple eMBMS service sources according to the present disclosure. As shown in FIG. 3, on a basis of the foregoing Embodiment 1 and Embodiment 2, when this embodiment is executed by user equipment (a mobile phone or a tablet computer), specific implementation steps of the providing the integrated service list to user equipment, so that a user selects a target service according to the integrated service list in step S103 are as follows.

S301. Display the integrated service list, so that the user selects the target service according to the integrated service list.

In this embodiment, an execution body is the user equipment. If the user equipment has a play and display capability, the integrated service list may be displayed to the user directly using an application program, so that the user selects the target service.

S302. Receive an operation of selecting the target service by the user.

In this embodiment, the received service request is the target service that is selected by the user according to a requirement of the user and is sent using the application program, or an identifier corresponding to the target service.

S303. Search, according to the first correspondence or the second correspondence, for the at least one network device corresponding to the target service.

In this embodiment, the recorded first correspondence or second correspondence is queried according to the target service, to obtain the at least one network device corresponding to the target service, that is, a situation in which multiple network devices can provide the target service exists.

S304. Obtain, from the at least one network device corresponding to the target service, service data of the target service.

In this embodiment, the service data corresponding to the target service is obtained from the at least one network device, and a specific obtaining manner is not limited, and may be selected according to an actual situation. If only one network device can provide the target service, the service data corresponding to the target service can be obtained only from the network device; if multiple network devices can provide the target service, data corresponding to multiple target services may be obtained and merged, so that target data is more precise, or a first network device with a strongest eMBMS signal may be selected from the multiple network devices, and data that is corresponding to the target service and that is in the first network device is obtained as the service data of the target service.

In the foregoing embodiment shown in FIG. 2 or FIG. 3, S204 or S304 includes the following two implementation manners.

First implementation manner includes obtaining, from each of the network devices corresponding to the target service, data of a service corresponding to the target service, where the data is processed by merging into the service data of the target service.

In this embodiment, if there are two or more network devices that support the service corresponding to the service request, the data of the service can be obtained from each of the network devices and processed. For example, correct data is selected as the service data, or all data is directly merged and parsed to obtain final service data.

Second implementation manner includes selecting, from each of the network devices corresponding to the target service, a first network device with a strongest eMBMS signal; and obtaining data that is corresponding to the target service and is in the first network device as the service data of the target service.

In this embodiment, an eMBMS signal of each of the network devices may further be obtained, and the first network device with the strongest eMBMS signal may be selected from the network devices, and the data of the service is obtained from the first network device as the final service data.

Whether an eMBMS signal is strong or poor depends on quality of the eMBMS signal, where the quality of the eMBMS signal may be measured using an indicator such as reference signal received power (RSRP) and reference signal received quality (RSRQ), where the quality of the eMBMS signal may be obtained from a device that receives a network device signal. An obtaining manner may be active querying, or active reporting by a receiving device. For a specific manner of obtaining the eMBMS signal, refer to the foregoing methods, or all other obtaining manners in the prior art may be used, which is not limited by the present disclosure.

According to the processing method for multiple eMBMS service sources provided in this embodiment, service lists sent by multiple network devices are received simultaneously; merging processing is performed on all the service lists to obtain an integrated service list, and a first correspondence between a service list and a network device, and a second correspondence between each service in all the service lists and each network device are recorded; the first correspondence or the second correspondence is queried, according to a service request sent by a user, to obtain all network devices that support the target service; data of the service is obtained from all the network devices, and is processed to obtain final service data. Compared with the prior art in which only one service list and data can be received, in the processing method for multiple eMBMS service sources, service data is obtained by merging multiple service lists and by processing data of a service, which enriches service functions and improves precision of the service data.

On a basis of the foregoing Embodiment 1, Embodiment 2, Embodiment 3, and Embodiment 4, the following specially uses an instance to describe a processing method for multiple eMBMS service sources according to the present disclosure.

Figure 4A:
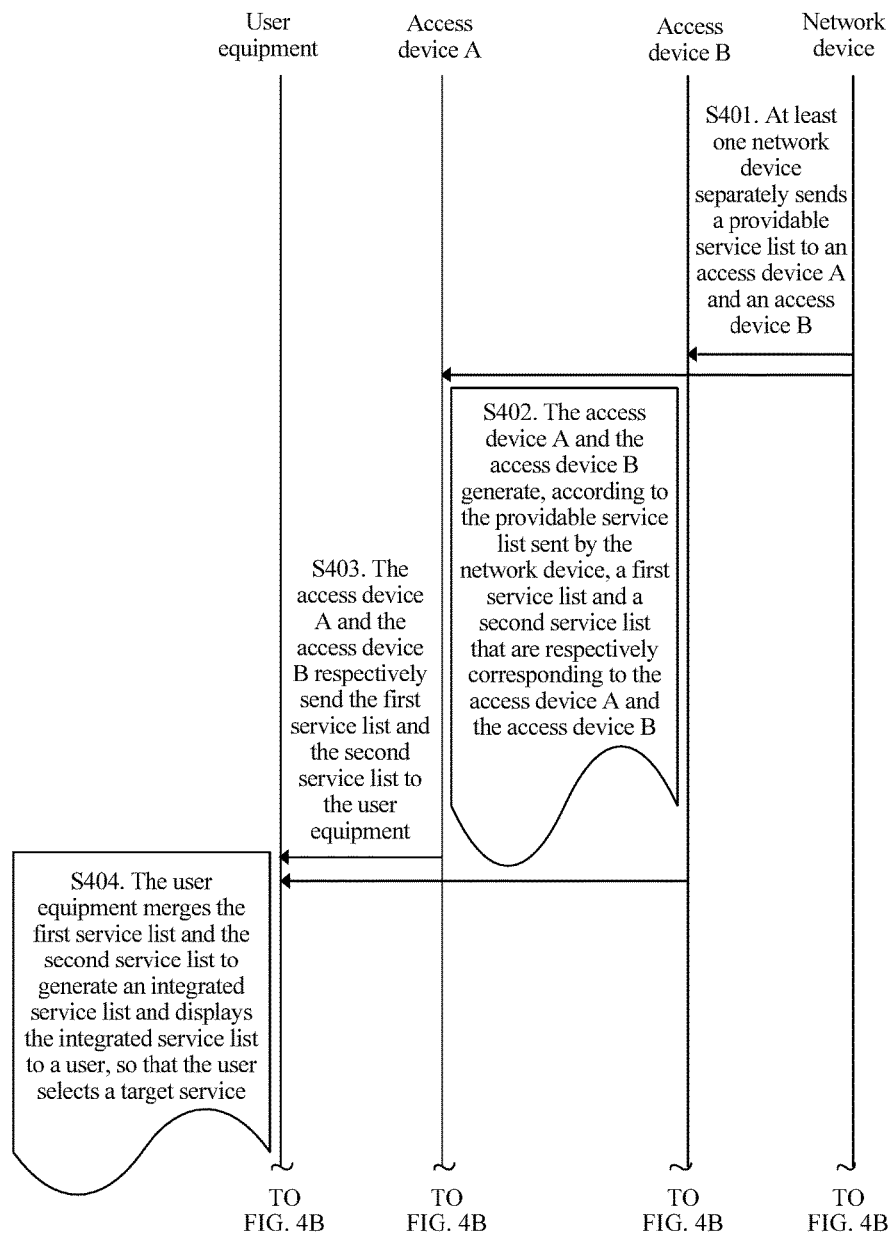
FIG. 4A and FIG. 4B are a flowchart of Embodiment 5 of a processing method for multiple eMBMS service sources according to the present disclosure.
Figure 4B:
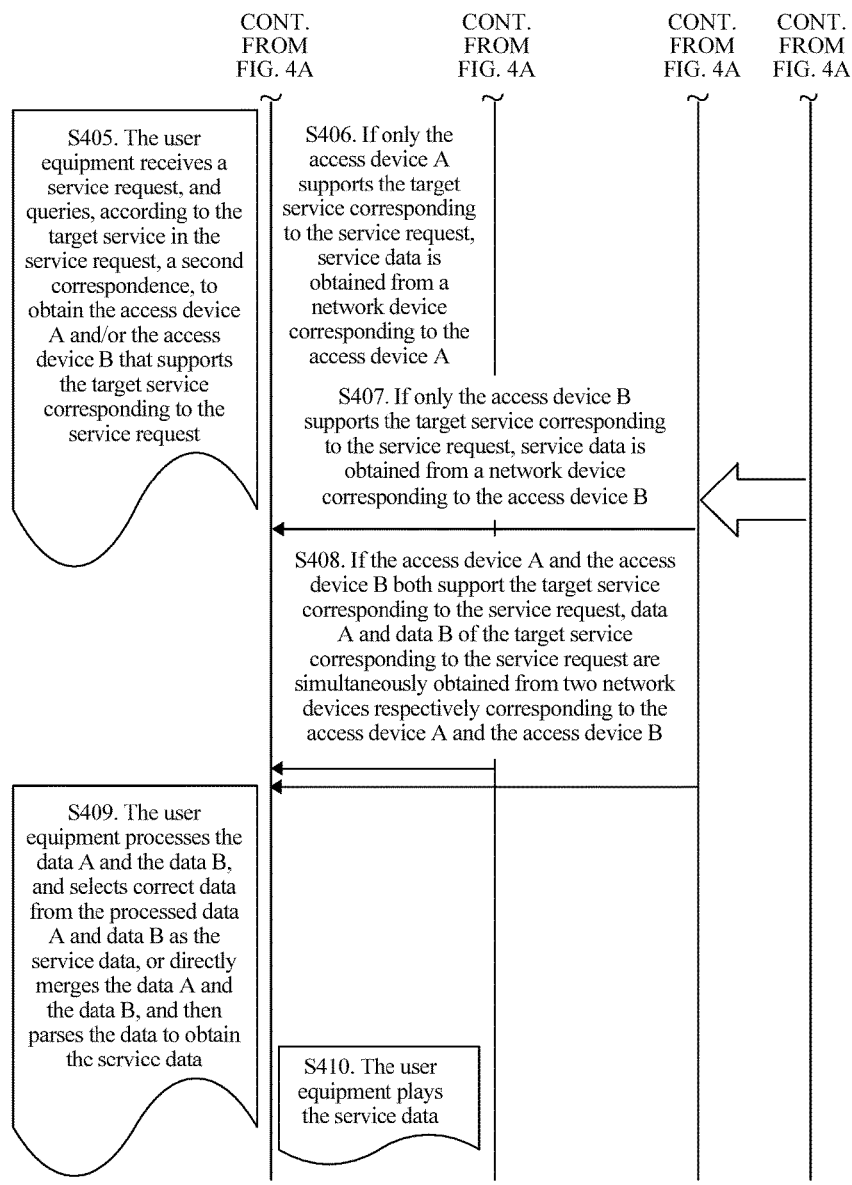

FIG. 4A and FIG. 4B are a flowchart of Embodiment 5 of a processing method for multiple eMBMS service sources according to the present disclosure. This embodiment includes user equipment, two access devices (two routers), and two network devices, where the access devices correspond to the network devices one to one, and the devices can communicate with each other. An action of merging processing is completed by the user equipment. A specific connection manner may be a function interface connection, a wired connection, a wireless connection, and the like. As shown in FIG. 4A and FIG. 4B, specific steps are as follows.

S401. At least one network device separately sends an available service list to an access device A and an access device B.

S402. The access device A and the access device B generate, according to the available service list sent by the network device, a first service list and a second service list that are respectively corresponding to the access device A and the access device B.

S403. The access device A and the access device B respectively send the first service list and the second service list to user equipment.

S404. The user equipment merges the first service list and the second service list to generate an integrated service list and displays the integrated service list to a user, so that the user selects a target service.

In this embodiment, a first correspondence between a service list and an access device is recorded, or a second correspondence between each service and a corresponding access device or network device is recorded.

S405. The user equipment receives a service request, and queries, according to the target service in the service request, a second correspondence, to obtain the access device A and/or the access device B that supports the target service corresponding to the service request.

In this embodiment, that is, the network device that can support the target service is a network device corresponding to the access device A and/or the access device B.

S406. If only the access device A supports the target service corresponding to the service request, service data is obtained from a network device corresponding to the access device A.

S407. If only the access device B supports the target service corresponding to the service request, service data is obtained from a network device corresponding to the access device B.

S408. If the access device A and the access device B both support the target service corresponding to the service request, data A and data B of the target service corresponding to the service request are simultaneously obtained from two network devices respectively corresponding to the access device A and the access device B.

S409. The user equipment processes the data A and the data B, and selects correct data from the processed data A and data B as the service data, or directly merges the data A and the data B, and then parses the data to obtain the service data.

In this embodiment, a function of merging processing may also be completed by an access device, which completes merging of the service list, and when multiple pieces of service data are obtained, merges the multiple pieces of data. However, in a process in which the access device completes the function of merging processing, the access device needs to send the integrated service list to the user equipment, receive the service request sent by the user equipment, and send the merged service data to the user equipment for play.

S410. The user equipment plays the service data.

In this embodiment, S406, S407, S408, and S409 are parallel technical solutions, and are not executed concurrently, which may be selected according to an actual situation.

According to the processing method for multiple eMBMS service sources provided in this embodiment, service lists sent by multiple network devices using different access devices are received simultaneously; merging processing is performed on all the service lists to obtain an integrated service list, and a first correspondence between a service list and a network device, and a second correspondence between each service in all the service lists and each network device are recorded; the first correspondence or the second correspondence is queried, according to a service request sent by a user, to obtain all network devices that support the target service; data of the service is obtained from all the network devices, and is processed to obtain final service data. Compared with the prior art in which a service list and data of only one eMBMS receiving unit can be received, in the processing method for multiple eMBMS service sources, service lists sent by multiple network devices are merged, so as to provide richer service functions to a user; service data is obtained from a network device or an access device with a strongest eMBMS signal, or data of a service of each network device is merged in an integrated manner to obtain final service data, which improves precision of the service data, and obtains better service experience.

Figure 5:
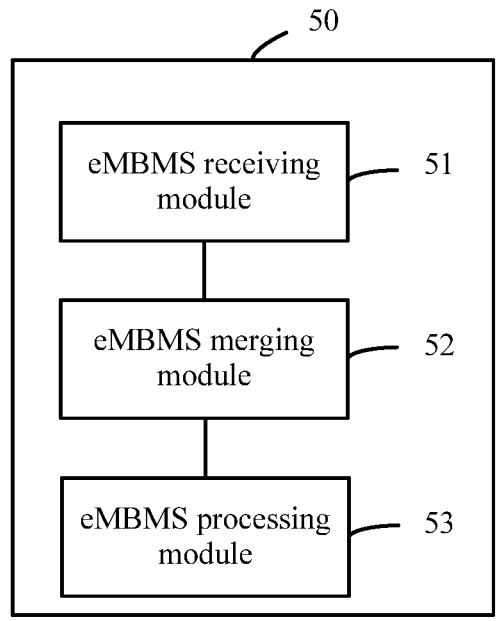
FIG. 5 is a schematic structural diagram of Embodiment 1 of a processing apparatus for multiple eMBMS service sources according to the present disclosure.

FIG. 5 is a schematic structural diagram of Embodiment 1 of a processing apparatus for multiple eMBMS service sources according to the present disclosure. As shown in FIG. 5, a processing apparatus 50 for multiple eMBMS service sources includes an eMBMS receiving module 51, an eMBMS merging module 52, and an eMBMS processing module 53, where the eMBMS receiving module 51 is configured to receive at least one service list sent by at least one network device; the eMBMS merging module 52 is configured to merge the at least one service list to generate an integrated service list, where the integrated service list records a first correspondence between the at least one service list and the at least one network device, where each of the service list includes at least one service; and the eMBMS processing module 53 is configured to provide the integrated service list to user equipment, so that a user selects a target service according to the integrated service list.

In this embodiment, a quantity of the eMBMS receiving modules 51 is not limited, and the eMBMS receiving module 51 may be located inside the processing apparatus 50 for multiple eMBMS service sources. If the processing apparatus 50 for multiple eMBMS service sources is user equipment, the eMBMS receiving module may be a module with an eMBMS service receiving capability inside the user equipment, and may also be a module with an eMBMS service receiving capability in an external access device disposed outside the user equipment. The eMBMS merging module 52 and the eMBMS processing module 53 may be disposed inside an eMBMS service component that is inside the processing apparatus 50 for multiple eMBMS service sources.

A quantity of the service lists received by the processing apparatus 50 for multiple eMBMS service sources is the same as that of the eMBMS receiving modules, that is, each eMBMS receiving module provides one service list to the processing apparatus 50 for multiple eMBMS service sources, and each service list may be provided by a same network device or by different network devices, which is subject to a network device that sends the service list received by the eMBMS receiving module, and strength of a signal that can be received from the network device.

The processing apparatus for multiple eMBMS service sources provided in this embodiment is configured to execute the methods provided in the method embodiments shown in FIG. 1 to FIG. 3, where an eMBMS receiving module receives service lists sent by multiple network devices; an eMBMS merging module merges all the received service lists to form an integrated service list; and an eMBMS processing module provides the integrated service list to user equipment, so that a user selects a target service according to the integrated service list. Compared with the prior art in which a service list and data are received from a unique eMBMS receiving unit, the processing apparatus for multiple eMBMS service sources effectively increases service types, and enriches service functions.

In Embodiment 2 of a processing apparatus for multiple eMBMS service sources according to the present disclosure, the eMBMS merging module 52 is configured to add the at least one service list to generate the integrated service list, where a repeated or non-repeated service exists in the at least one service list included in the integrated service list.

Optionally, the eMBMS merging module 52 is configured to merge the service of the at least one service list to generate the integrated service list, where no service included in the integrated service list is repeated; and record, according to the first correspondence, a second correspondence between each service and the at least one network device that sends the service.

Figure 6:
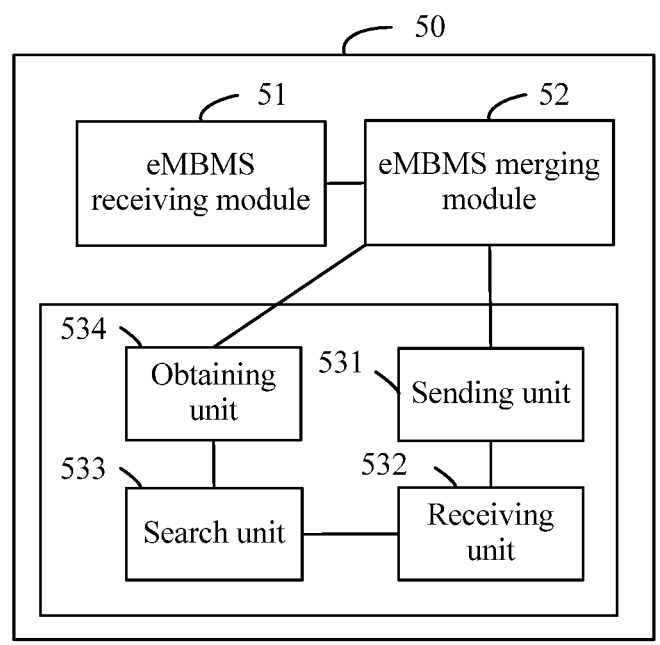
FIG. 6 is a schematic structural diagram of Embodiment 3 of a processing apparatus for multiple eMBMS service sources according to the present disclosure.

FIG. 6 is a schematic structural diagram of Embodiment 3 of a processing apparatus for multiple eMBMS service sources according to the present disclosure. As shown in FIG. 6, the eMBMS processing module 53 includes a sending unit 531 configured to send the integrated service list to the user equipment, so that the user selects the target service according to the integrated service list; a receiving unit 532 configured to receive a service request sent by the user equipment, where the service request includes the target service selected by the user; a search unit 533 configured to search, according to the first correspondence or the second correspondence, for the at least one network device corresponding to the target service; and an obtaining unit 534 configured to obtain, from the at least one network device corresponding to the target service, service data of the target service.

Figure 7:
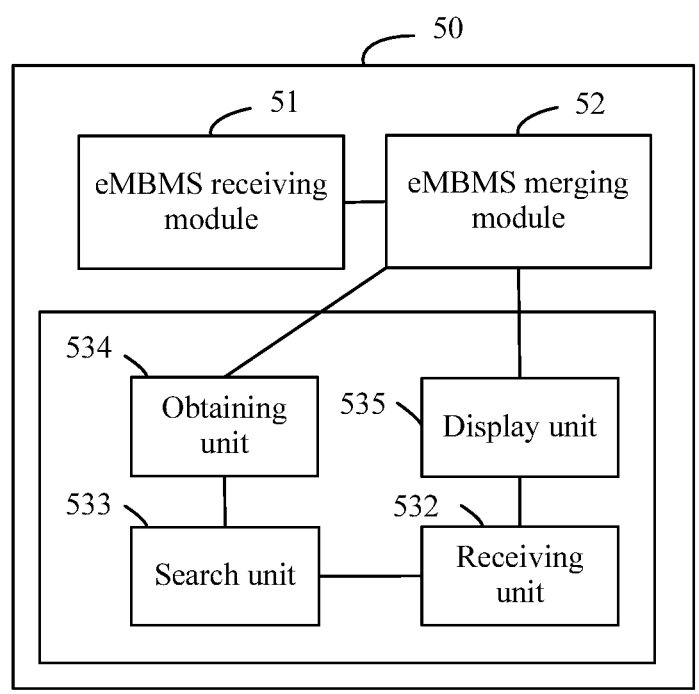
FIG. 7 is a schematic structural diagram of Embodiment 4 of a processing apparatus for multiple eMBMS service sources according to the present disclosure.

FIG. 7 is a schematic structural diagram of Embodiment 4 of a processing apparatus for multiple eMBMS service sources according to the present disclosure. As shown in FIG. 7, the eMBMS processing module 53 includes a display unit 535 configured to display the integrated service list, so that the user selects the target service according to the integrated service list; a receiving unit 532 configured to receive an operation of selecting the target service by the user; a search unit 533 configured to search, according to the first correspondence or the second correspondence, for the at least one network device corresponding to the target service; and an obtaining unit 534 configured to obtain, from the at least one network device corresponding to the target service, service data of the target service.

On a basis of the foregoing embodiment shown in FIG. 6 or FIG. 7, if a quantity of the network devices corresponding to the target service is greater than one, the obtaining unit 533 is configured to obtain, from each of the network devices corresponding to the target service, data of a service corresponding to the target service, where the data is processed by merging into the service data of the target service; or select, from each of the network devices corresponding to the target service, a first network device with a strongest eMBMS signal; and obtain data that is corresponding to the target service and is in the first network device as the service data of the target service.

On a basis of the foregoing apparatus embodiments shown in FIG. 5 to FIG. 7, the following specially uses an instance to describe a processing process and an implementation manner of a processing apparatus for multiple eMBMS service sources according to the present disclosure in a practical application.

Figure 8A:
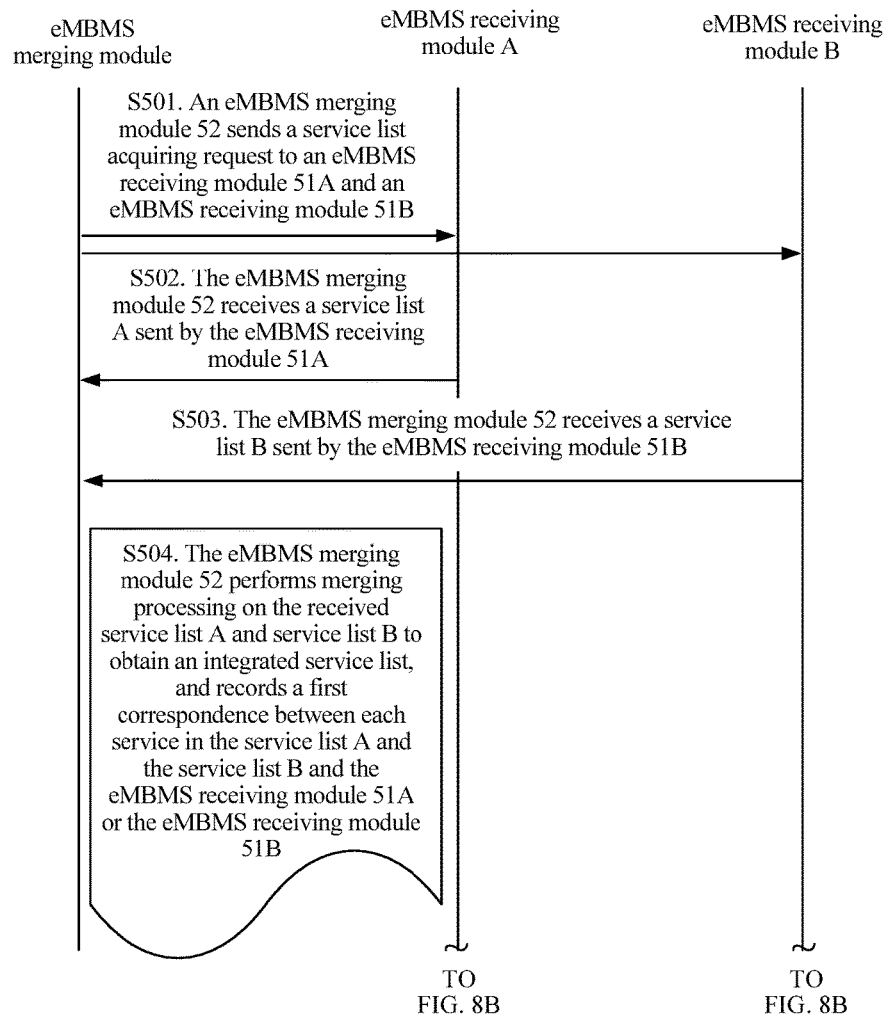
FIG. 8A and FIG. 8B are a flowchart of an application of a processing apparatus for multiple eMBMS service sources according to the present disclosure.
Figure 8B:
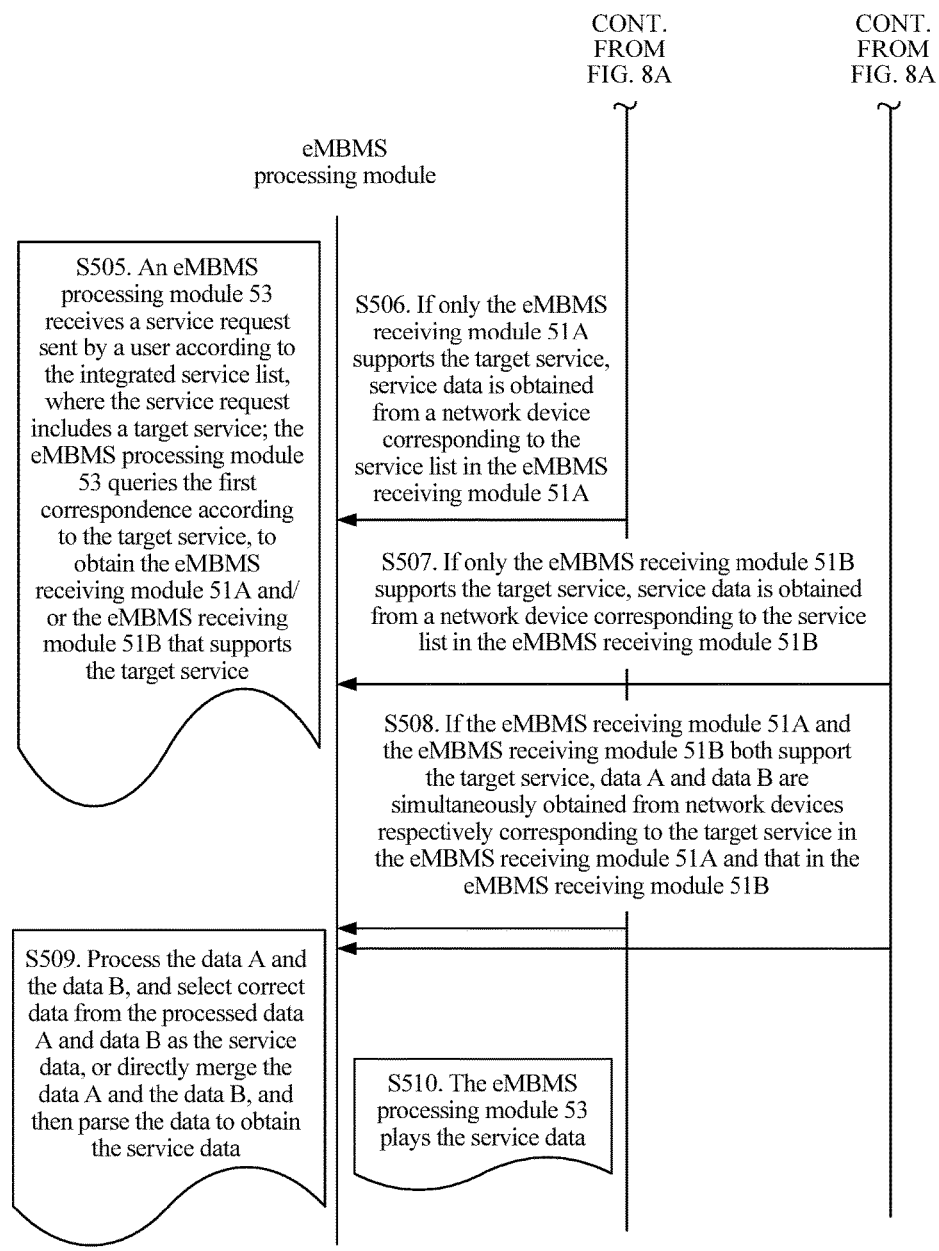

FIG. 8A and FIG. 8B are a flowchart of an application of a processing apparatus for multiple eMBMS service sources according to the present disclosure. In this embodiment, the processing apparatus for multiple eMBMS service sources includes at least two eMBMS receiving modules 51 (A and B), one eMBMS merging module 52, and one eMBMS processing module 53. A quantity of network devices is not limited. It is assumed that each eMBMS receiving module 51 receives only one service list, and the modules can communicate with each other. A specific connection manner may be a function interface connection, a wired connection, a wireless connection, and the like. As shown in FIG. 8A and FIG. 8B, specific implementation steps of the processing apparatus for multiple eMBMS service sources are as follows.

S501. The eMBMS merging module 52 sends a service list obtaining request to the eMBMS receiving module 51A and the eMBMS receiving module 51B.

S502. The eMBMS merging module 52 receives a service list A sent by the eMBMS receiving module 51A.

S503. The eMBMS merging module 52 receives a service list B sent by the eMBMS receiving module 51B.

S504. The eMBMS merging module 52 performs merging processing on the received service list A and service list B to obtain an integrated service list, and records a first correspondence between each service in the service list A and the service list B and the eMBMS receiving module 51A or the eMBMS receiving module 51B.

S505. The eMBMS processing module 53 receives a service request sent by a user according to the integrated service list, where the service request includes a target service; the eMBMS processing module 53 queries the first correspondence according to the target service, to obtain the eMBMS receiving module 51A and/or the eMBMS receiving module 51B that supports the target service.

S506. If only the eMBMS receiving module 51A supports the target service, service data is obtained from a network device corresponding to the service list in the eMBMS receiving module 51A.

S507. If only the eMBMS receiving module 51B supports the target service, service data is obtained from a network device corresponding to the service list in the eMBMS receiving module 51B.

S508. If the eMBMS receiving module 51A and the eMBMS receiving module 51B both support the target service, data A and data B are simultaneously obtained from network devices respectively corresponding to the target service in the eMBMS receiving module 51A and that in the eMBMS receiving module 51B.

In this embodiment, the data of the service list corresponding to the eMBMS receiving module 51A and the data of the service list corresponding to the eMBMS receiving module 51B may be on a same network device, and may also be on different network devices.

S509. Process the data A and the data B, and select correct data from the processed data A and data B as the service data, or directly merge the data A and the data B, and then parse the data to obtain the service data.

S510. The eMBMS processing module 53 plays the service data.

In this embodiment, if the eMBMS merging module and the eMBMS processing module are both integrated inside user equipment itself, the service data can be played directly using a play unit in the eMBMS processing module 53; if the eMBMS merging module and the eMBMS processing module are integrated in an access device, the service data need be sent to the user equipment for play.

In this embodiment, S505, S507, S508, and S509 are parallel technical solutions, and are not executed concurrently, which may be selected according to an actual situation.

On a basis of the foregoing embodiment, the processing apparatus for multiple eMBMS service sources have several types of application scenarios, which are briefly described in the following.

Figure 9:
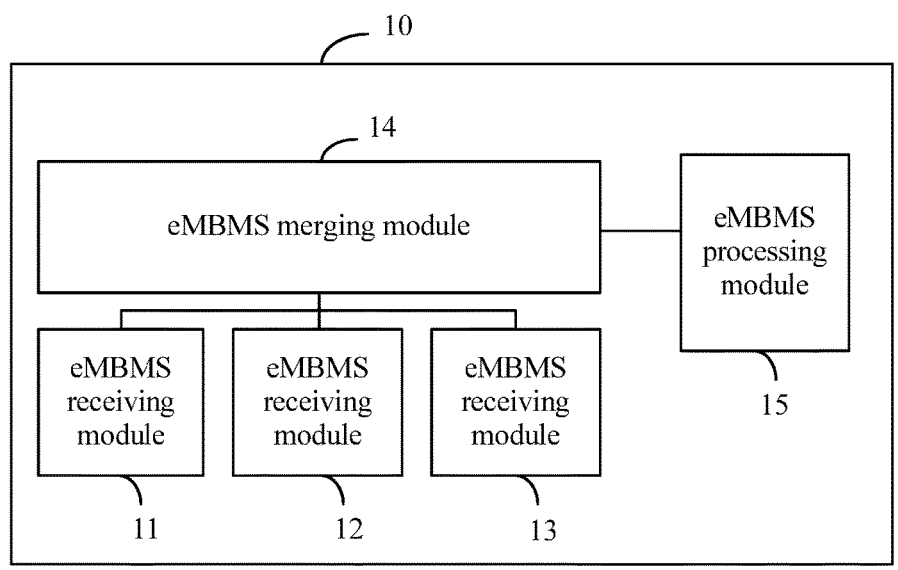
FIG. 9 is a schematic structural diagram of an application of a processing apparatus for multiple eMBMS service sources according to the present disclosure.

FIG. 9 is a schematic structural diagram of an application of a processing apparatus for multiple eMBMS service sources according to the present disclosure. As shown in FIG. 9, a processing apparatus 10 for multiple eMBMS service sources includes an eMBMS receiving module 11, an eMBMS receiving module 12, an eMBMS receiving module 13, an eMBMS merging module 14, and an eMBMS processing module 15.

In this embodiment, all the eMBMS receiving modules are inside the processing apparatus 10 for eMBMS service sources, and a quantity of the eMBMS receiving modules is not limited, and one or more eMBMS receiving modules may be integrated according to a requirement.

A processing principle and an effect of this embodiment are consistent with those of the apparatus application embodiment shown in FIG. 8A and FIG. 8B. A technical solution of this embodiment used to execute a method embodiment has an implementation principle and a technical effect similar to those of the apparatus application embodiment shown in FIG. 8A and FIG. 8B, and details are not described herein again.

Figure 10:
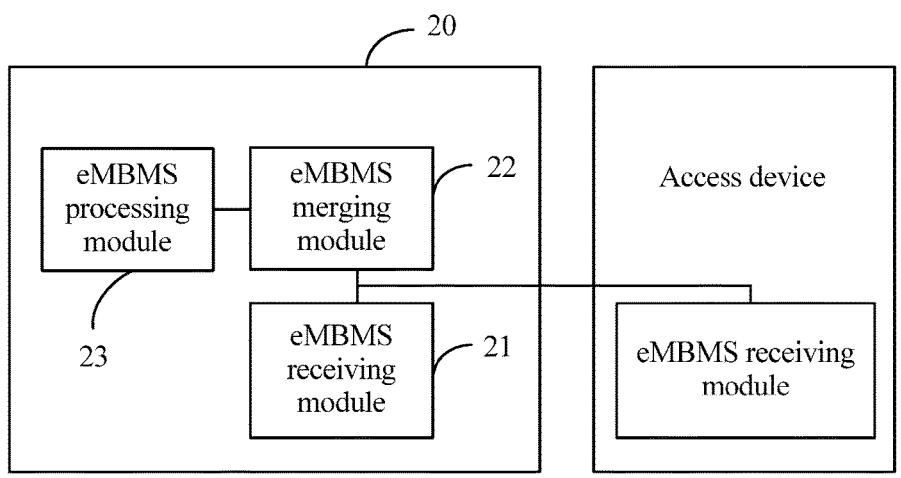
FIG. 10 is a schematic structural diagram of still another application of a processing apparatus for multiple eMBMS service sources according to the present disclosure.

FIG. 10 is a schematic structural diagram of still another application of a processing apparatus for multiple eMBMS service sources according to the present disclosure. As shown in FIG. 10, a processing apparatus 20 for multiple eMBMS service sources includes an eMBMS receiving module 21, an eMBMS merging module 22, and an eMBMS processing module 23.

In this embodiment, an access device is externally connected to the processing apparatus 20 for eMBMS service sources, where the access device includes at least one eMBMS receiving module. A quantity of the externally connected access devices is not limited, and a quantity of the eMBMS receiving modules in each access device is not limited, either. A service list and service data sent by a network device are obtained using the access device, and are separately provided to the eMBMS merging module and the eMBMS processing module for processing.

A processing principle and an effect of this embodiment are consistent with those of the apparatus application embodiment shown in FIG. 8A and FIG. 8B. A technical solution of this embodiment used to execute a method embodiment has an implementation principle and a technical effect similar to those of the apparatus application embodiment shown in FIG. 8A and FIG. 8B, and details are not described herein again.

Figure 11:
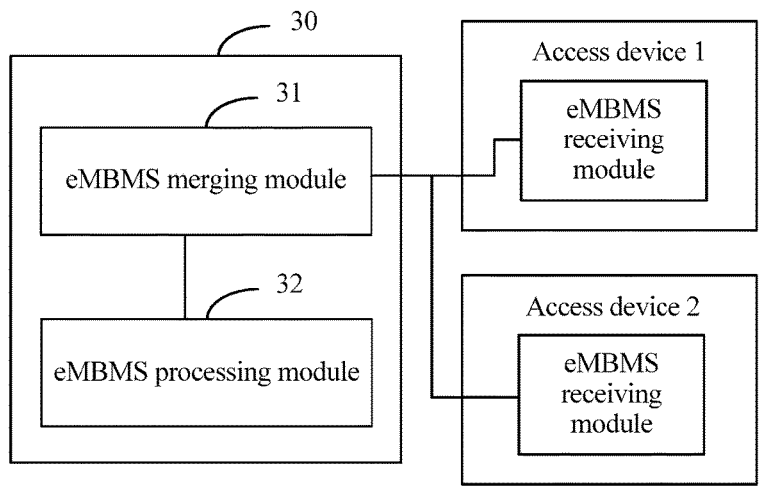
FIG. 11 is a schematic structural diagram of another application of a processing apparatus for multiple eMBMS service sources according to the present disclosure.

FIG. 11 is a schematic structural diagram of another application of a processing apparatus for multiple eMBMS service sources according to the present disclosure. As shown in FIG. 11, a processing apparatus 30 for multiple eMBMS service sources includes an eMBMS merging module 31 and an eMBMS processing module 32.

In this embodiment, at least one access device (for example, an access device 1 and an access device 2) is externally connected to the processing apparatus 30 for eMBMS service sources, and each access device includes at least one eMBMS receiving module. A quantity of the externally connected access devices is not limited, and a quantity of the eMBMS receiving modules in each access device is not limited, either.

If the processing apparatus for multiple eMBMS service sources is user equipment, the processing apparatus further includes a related application program. A user selects a required service using the application program. After the required service is selected, the eMBMS processing module queries a first correspondence according to a service request (the service request includes a type or a flag of the required service), to obtain an eMBMS receiving module and a network device that support a target service corresponding to the service request. The eMBMS receiving module and the network device that support the service are unnecessarily unique. For example, a program is played on multiple television stations (for example, China Central Television (CCTV) 1, CCTV2, CCTV3), and a service list sent by the eMBMS receiving module inside the user equipment only includes all services of CCTV1, and a service list sent by the eMBMS receiving module of an external access device only includes all services of CCTV2; for the user equipment, there are at least two eMBMS receiving modules that support the program (the service). If a service list of the eMBMS receiving module in still another access device also includes the service, a quantity of the eMBMS receiving modules that support the program (the service) is deduced from this.

A processing principle and an effect of this embodiment are consistent with those of the apparatus application embodiment shown in FIG. 8A and FIG. 8B. A technical solution of this embodiment used to execute a method embodiment has an implementation principle and a technical effect similar to those of the apparatus application embodiment shown in FIG. 8A and FIG. 8B, and details are not described herein again.

Figure 12:
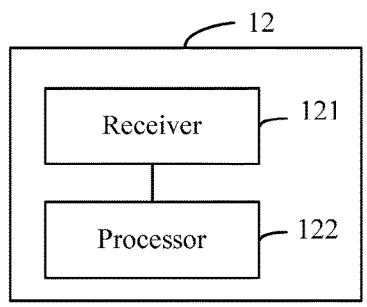
FIG. 12 is a schematic structural diagram of Embodiment 1 of a terminal device according to the present disclosure.

FIG. 12 is a schematic structural diagram of Embodiment 1 of a terminal device according to the present disclosure. As shown in FIG. 12, a terminal device 12 includes a receiver 121 configured to receive at least one service list sent by at least one network device; and a processor 122 configured to merge the at least one service list to generate an integrated service list, where the integrated service list records a first correspondence between the at least one service list and the at least one network device, where each of the service list includes at least one service; and the processor 122 is further configured to provide the integrated service list to user equipment, so that a user selects a target service according to the integrated service list.

The terminal device provided in this embodiment is an entity corresponding to an apparatus embodiment. A technical solution of this embodiment used to execute a method embodiment has an implementation principle and a technical effect similar to those of the apparatus embodiment, and details are not described herein again.

On a basis of the foregoing embodiment, the processor 122 is configured to add the at least one service list to generate the integrated service list, where a repeated or non-repeated service exists in the at least one service list included in the integrated service list.

Optionally, the processor 122 is configured to merge the service of the at least one service list to generate the integrated service list, where no service included in the integrated service list is repeated; and record, according to the first correspondence, a second correspondence between each service and the at least one network device that sends the service.

Figure 13:
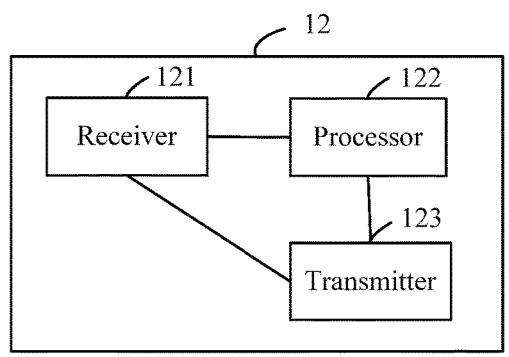
FIG. 13 is a schematic structural diagram of Embodiment 2 of a terminal device according to the present disclosure.

FIG. 13 is a schematic structural diagram of Embodiment 2 of a terminal device according to the present disclosure, where the terminal device further includes a transmitter 123 configured to send the integrated service list to the user equipment, so that the user selects the target service according to the integrated service list; where the receiver 121 is further configured to receive a service request sent by the user equipment, where the service request includes the target service selected by the user; the processor 122 is further configured to search, according to the first correspondence or the second correspondence, for the at least one network device corresponding to the target service; and the processor 122 is further configured to obtain, from the at least one network device corresponding to the target service, service data of the target service.

Figure 14:
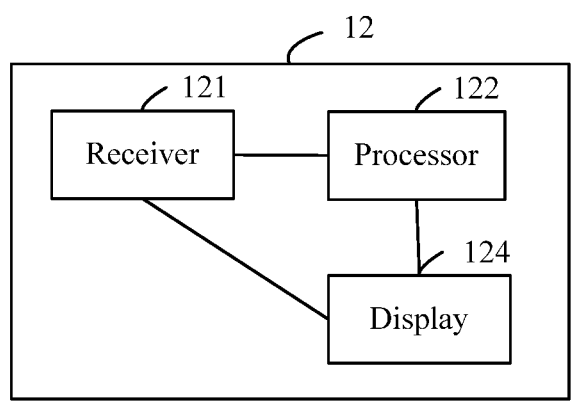
FIG. 14 is a schematic structural diagram of Embodiment 3 of a terminal device according to the present disclosure.

FIG. 14 is a schematic structural diagram of Embodiment 3 of a terminal device according to the present disclosure, where the terminal device further includes a display 124 configured to display the integrated service list, so that the user selects the target service according to the integrated service list; where the receiver 121 is further configured to receive an operation of selecting the target service by the user; the processor 122 is further configured to search, according to the first correspondence or the second correspondence, for the at least one network device corresponding to the target service; and the processor 122 is further configured to obtain, from the at least one network device corresponding to the target service, service data of the target service.

On a basis of the foregoing FIG. 13 or FIG. 14, if a quantity of the network devices corresponding to the target service is greater than one, the processor 122 is configured to obtain, from each of the network devices corresponding to the target service, data of a service corresponding to the target service, where the data is processed by merging into the service data of the target service; or select, from each of the network devices corresponding to the target service, a first network device with a strongest eMBMS signal; and obtain data that is corresponding to the target service and is in the first network device as the service data of the target service.

The terminal device provided in this embodiment is an entity corresponding to an apparatus embodiment. A technical solution of this embodiment used to execute a method embodiment has an implementation principle and a technical effect similar to those of the apparatus embodiment, and details are not described herein again.

Further, in the foregoing Embodiments 1 to 3, it should be understood that, the processor 122 may be a central processing unit (CPU), and may also be another general purpose processor, a digital signal processor (DSP), an application-specific integrated circuit (ASIC), a field-programmable gate array (FPGA), or another programmable logic device, a discrete gate or transistor logic device, a discrete hardware assembly, or the like, where the general purpose processor may be a microprocessor, or the processor may also be any normal processor, or the like. The display may be hardware or software in any form of a liquid crystal display, a speaker, a music player, a video player, and a picture player. Each step in the method embodiments may be completed using an integrated logic circuit of the hardware in the terminal device and/or an access device or an instruction in the form of software. The steps of the method disclosed with reference to the embodiments of the present disclosure may be directly performed by a hardware processor, or may be performed using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A processing method for multiple evolved multimedia broadcast multicast service (eMBMS) service sources, the processing method comprising:

receiving a first service list of a plurality of service lists, the first service list corresponding to a first network device of a plurality of network devices;

receiving a second service list of the plurality of service lists, the second service list corresponding to a second network device of the plurality of network devices;

merging the plurality of service lists to generate an integrated service list, the integrated service list recording a first correspondence between each of the plurality of service lists and a respective network device of the plurality of network devices, each of the plurality of service lists of the integrated service list comprising at least one service, and the integrated service list including a repeated service;

providing the integrated service list to user equipment so that a user selects a target service according to the integrated service list, the target service corresponding to the repeated service;

simultaneously receiving the target service from the first and second network devices;

measuring a first measured quality of a first eMBMS signal corresponding to the target service and the first network device;

measuring a second measured quality of a second eMBMS signal corresponding to the target service and the second network device;

determining that the first measured quality is greater than the second measured quality; and obtaining data corresponding to the target service from the first network device as service data of the target service based on the first measured quality being greater than the second measured quality.

2. The processing method of claim 1, wherein merging the plurality of service lists to generate the integrated service list comprises adding the plurality of service lists to generate the integrated service list, wherein the repeated service exists in the first and second service lists comprised in the integrated service list.

3. The processing method of claim 1, wherein merging the plurality of service lists to generate the integrated service list comprises adding the plurality of service lists to generate the integrated service list, wherein a non-repeated service exists in the first and second service lists comprised in the integrated service list.

4. The processing method of claim 1, wherein merging the plurality of service lists to generate the integrated service list further comprises recording, according to the first correspondence, a second correspondence between each service in the plurality of service lists and a network device of the plurality of network devices that corresponds to the service.

5. The processing method of claim 4, wherein providing the integrated service list to the user equipment so that the user selects the target service according to the integrated service list comprises:

sending the integrated service list to the user equipment so that the user selects the target service according to the integrated service list;

receiving a service request from the user equipment, wherein the service request comprises the target service selected by the user; and searching, according to the first correspondence or the second correspondence, for each network device of the plurality of network devices that corresponds to the target service.

6. The processing method of claim 4, wherein providing the integrated service list to the user equipment so that the user selects the target service according to the integrated service list comprises:

displaying the integrated service list so that the user selects the target service according to the integrated service list;

receiving an operation of selecting the target service by the user; and searching, according to the first correspondence or the second correspondence, for each network device of the plurality of network devices that corresponds to the target service.

7. A terminal device, comprising:

a receiver configured to receive:
- a first service list of a plurality of service lists, the first service list corresponding to a first network device of a plurality of network devices; and
- a second service list of the plurality of service lists, the second service list corresponding to a second network device of the plurality of network devices; and a processor coupled to the receiver and configured to:
- merge the plurality of service lists to generate an integrated service list, the integrated service list recording a first correspondence between each of the plurality of service lists and a respective network device of the plurality of network devices, each of the plurality of service lists of the integrated service list comprising at least one service, and the integrated service list including a repeated service;
- provide the integrated service list to user equipment so that a user selects a target service according to the integrated service list, the target service corresponding to the repeated service;
- simultaneously receive the target service from the first and second network devices;
- measure a first measured quality of a first eMBMS signal corresponding to the target service and the first network device;
- measure a second measured quality of a second eMBMS signal corresponding to the target service and the second network device;
- determine that the first measured quality is greater than the second measured quality; and
- obtain data corresponding to the target service from the first network device as service data of the target service based on the first measured quality being greater than the second measured quality.

8. The terminal device of claim 7, wherein the processor is further configured to add the plurality of service lists to generate the integrated service list, wherein the first service list and the second service list include the repeated service.

9. The terminal device of claim 7, wherein the processor is further configured to add the plurality of service lists to generate the integrated service list, wherein the first service list and the second service list include a non-repeated service.

10. The terminal device of claim 7, wherein the processor is further configured to record, according to the first correspondence, a second correspondence between each service in the plurality of service lists and a network device of the plurality of network devices that corresponds to the service.

11. The terminal device of claim 10, further comprising a transmitter coupled to the processor and configured to send the integrated service list to the user equipment so that the user selects the target service according to the integrated service list, wherein the receiver is further configured to receive a service request from the user equipment, the service request comprises the target service selected by the user, and the processor is further configured to search, according to the first correspondence or the second correspondence, for each network device of the plurality of network devices that corresponds to the target service.

12. The terminal device of claim 10, further comprising a display coupled to the processor and configured to display the integrated service list so that the user selects the target service according to the integrated service list, wherein the receiver is further configured to receive an operation of selecting the target service by the user, and the processor is further configured to search, according to the first correspondence or the second correspondence, for each network device of the plurality of network devices that corresponds to the target service.

13. A non-transitory computer readable medium storing instructions that, when executed by a processor, cause the processor to:
- receive a first service list of a plurality of service lists, the first service list corresponding to a first network device of a plurality of network devices;
- receive a second service list of the plurality of service lists, the second service list corresponding to a second network device of the plurality of network devices;
- merge the plurality of service lists to generate an integrated service list, the integrated service list recording a first correspondence between each of the plurality of service lists and a respective network device of the plurality of network devices, each of the plurality of service lists of the integrated service list comprising at least one service, and the integrated service list including a repeated service;
- provide the integrated service list to user equipment so that a user selects a target service according to the integrated service list, the target service corresponding to the repeated service;
- simultaneously receive the target service from the first and second network devices;
- measure a first measured quality of a first eMBMS signal corresponding to the target service and the first network device;
- measure a second measured quality of a second eMBMS signal corresponding to the target service and the second network device;
- determine that the first measured quality is greater than the second measured quality; and
- obtain data corresponding to the target service from the first network device as service data of the target service based on the first measured quality being greater than the second measured quality.

14. The non-transitory computer readable medium of claim 13, wherein, when executed by the processor, the instructions are configured to cause the processor to add the plurality of service lists to generate the integrated service list, wherein the repeated service exists in the first and second service lists comprised in the integrated service list.

15. The non-transitory computer readable medium of claim 13, wherein, when executed by the processor, the instructions are configured to cause the processor to add the plurality of service lists to generate the integrated service list, wherein a non-repeated service exists in the first and second service lists comprised in the integrated service list.

* * * * *